US006269097B1

United States Patent
Keun et al.

(10) Patent No.: US 6,269,097 B1
(45) Date of Patent: Jul. 31, 2001

(54) TIME SWITCH WITH THE CONTROL MEMORY

(75) Inventors: Son-jeong Keun; Seung-youl Lee, both of Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/082,732

(22) Filed: May 21, 1998

(30) Foreign Application Priority Data

May 23, 1997 (KR) .................................................. 97-20209

(51) Int. Cl.[7] ............................ H04L 12/66; H04Q 11/00
(52) U.S. Cl. ............................................ 370/375; 370/369
(58) Field of Search ..................................... 370/375, 271, 370/307, 353, 355, 356, 359, 360, 362, 366, 367, 369, 371, 376, 379, 380, 382, 383, 392, 412, 413, 415, 417, 419, 421, 422, 423

(56) References Cited

U.S. PATENT DOCUMENTS

| 4,841,522 | * | 6/1989 | Yamazaki | 370/368 |
|---|---|---|---|---|
| 5,467,340 | * | 11/1995 | Umezu | 370/244 |
| 5,483,539 | * | 1/1996 | Kaufmann | 370/509 |
| 5,511,071 | * | 4/1996 | Gloess | 370/261 |
| 5,592,473 | * | 1/1997 | Matern et al. | 370/264 |
| 5,598,402 | * | 1/1997 | Mizsawa et al. | 370/225 |
| 5,654,967 | * | 8/1997 | Okuyama et al. | 370/375 |
| 5,784,369 | * | 7/1998 | Romiti et al. | 370/358 |
| 5,959,977 | * | 9/1999 | Park | 370/263 |
| 6,101,198 | * | 8/2000 | Koenig et al. | 370/535 |

\* cited by examiner

Primary Examiner—Dang Ton
Assistant Examiner—Phirin Sam
(74) Attorney, Agent, or Firm—Dilworth & Barrese, LLP (57) ABSTRACT

A time switch for use in communications systems and method for controlling the same is provided. The control memory is controlled by using a 16 bits data bus. The lower 9 bits represent information relating to the input port and time slot, and an upper 6 bits represent information which is needed for output conversion. The use of 16 bit control provides simplicity of time switch design by removing unnecessary elements of the prior art time switch and decreases the switch set up time. In addition, the time switch of the present invention makes it possible to process gain control from inside the time switch and eliminates the need for external gain control processing.

23 Claims, 11 Drawing Sheets

Fig.1 (Prior)

*Fig.2 (Prior)*

*Fig.3 (Prior)*

(A)

| A7 | A6 | A5 | A4 | A3 | A2 | A1 | A0 |
|----|----|----|----|----|----|----|----|
| INPUT PORT NUMBER 0~7 ||| INPUT CHANNEL NUMBER |||||

(B)

| A7 | A6 | A5 | A4 | A3 | A2 | A1 | A0 |
|----|----|----|----|----|----|----|----|
| INPUT PORT NUMBER 8~15 ||| INPUT CHANNEL NUMBER |||||

*Fig.4 (Prior)*

| ADDRESS(10-8) | ADDRESS(10-8) |
|---|---|
| 000 | ATTRIBUTE MEMORY |
| 001 | CONTROL MEMORY 0 |
| 010 | DATA MEMORY 0 |
| 011 | DATA MEMORY 0 |
| 100 | DON'T CARE |
| 101 | CONTROL MEMORY 1 |
| 110 | DATA MEMORY 1 |
| 110 | DATA MEMORY 1 |

*Fig.5 (Prior)*

(A)

| A7 | A6 | A5 | A4 | A3 | A2 | A1 | A0 |
|----|----|----|----|----|----|----|----|
| OUTPUT PORT 0~7 ||| OUTPUT CHANNEL NUMBER |||||

(B)

| A7 | A6 | A5 | A4 | A3 | A2 | A1 | A0 |
|----|----|----|----|----|----|----|----|
| OUTPUT PORT 8~15 ||| OUTPUT CHANNEL NUMBER |||||

*Fig.6 (Prior)*

| D7 | D6 | D5 | D4 | D3 | D2 | D1 | D0 |
|----|----|----|----|----|----|----|----|
| INPUT PORT 0~7/8~15 ||| INPUT CHANNEL NUMBER |||||

*Fig.7 (Prior)*

| A7 | A6 | A5 | A4 | A3 | A2 | A1 | A0 |
|----|----|----|----|----|----|----|----|
| OUTPUT PORT 0~7/8~15 ||| OUTPUT CHANNEL NUMBER |||||

*Fig.8 (Prior)*

| D7 | D6 | D5 | D4 | D3 | D2 | D1 | D0 |
|----|----|----|----|----|----|----|----|
| OUTPUT PORT 8~15 CONTROL BIT |||| OUTPUT PORT 0~7 CONTROL BIT ||||

*Fig.9 (Prior)*

| BIT | DESCRIPTION |
|---|---|
| D7~D6 | 0  0  MESSAGE MODE<br>0  1  SWITCH MODE : A μ-><br>1  0  SWITCH MODE  μ -> A<br>1  1  SWITCH MODE : NO CONVERSION |
| D5 | USER SETTING |
| D4 | 0     INPUT PORT 0~7<br>1     INPUT PORT 8~15 |
| D3~D2 | 0  0  MESSAGE MODE<br>0  1  SWITCH MODE : A μ-><br>1  0  SWITCH MODE  μ -> A<br>1  1  SWITCH MODE : NO CONVERSION |
| D1 | USER SETTING |
| D0 | 0     INPUT PORT 0~7<br>1     INPUT PORT 8~15 |

| D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|
| X | OPERATION MODE | | GAIN CONTROL | | | | INPUT PORT NUMBER | | | | INPUT CHANNEL NUMBER | | | | |

*Fig.13*

| BIT | VALUE | | DESCRIPTION |
|---|---|---|---|
| D15 | X | | DON'T CARE |
| D14~D13 | 0 | 0 | NOMAL MODE (GAIN CONTROL) |
| | 0 | 1 | A -> μ CONVERSION |
| | 1 | 0 | μ -> A CONVERSION |
| | 1 | 1 | MESSAGE MODE |

Fig.14

| BIT | VALUE | DESCRIPTION |
|---|---|---|
| D12~D9 (GAIN CONTROL) | 0000 | 0 dB |
| | 0001 | −1 dB |
| | 0010 | −2 dB |
| | 0011 | −3.5 dB |
| | 0100 | −4 dB |
| | 0101 | −5 dB |
| | 0110 | −6 dB |
| | 0111 | −7 dB |
| | 1000 | GAIN RAM 0 |
| | 1001 | GAIN RAM 1 |
| | 1010 | DON'T CARE |
| | 1011 | |
| | 1100 | |
| | 1101 | |
| | 1110 | |
| | 1111 | |

TIME SWITCH WITH THE CONTROL MEMORY

FIELD OF THE INVENTION

The present invention relates to a time switching control apparatus and method used in a TDM communication system. More specifically, it relates to an apparatus and method for controlling a 16×16 time switch for switching 512 time slots (i.e., 16 input ports×32) into time slots in any of 16 output ports (channels).

DESCRIPTION OF THE RELATED ART

Generally, a TDM communication system is composed of subscribers wanting to communicate with others, and a time switch connecting the subscribers according to time (by channel) for enabling the communication connection.

A Time Division Multiplexing (TDM) system is a method of transmission by which multiple input signals containing many subscribers' data are multiplexed on a time domain. The system divides data to be transmitted in each channel into Pulse Code Modulation (PCM) data (8 bits) units and transmits them at regular time intervals. The time interval during which each PCM data signal remains in a frame is called a time slot. For example, if n lines are multiplexed, n time slots must exist in a frame. The time slot is referred to as a channel.

The time division multiplexing switch, hereinafter referred to as the time switch, multiplexes many channel signals (time slots) onto a line (communication path) and transmits.

Once multiplexed, it is possible to change the time slot order on the multiplexed frame by using the time switch on the line while dividing the multiplexed signals. Namely, data of a time slot 0 is moved into a time slot 1, and the time slot 1 data is moved into the time slot 0. In this case, the line (port) is also switched as the channel.

Thus, it is possible to achieve communication between subscribers by assigning the time slot 0 and the time slot 1.

The switching of time slots can be carried out by using a buffer memory in the time switch to change the multiplexing order of the multiplexed time slot. This requires a data memory for saving the PCM data of each channel.

Since the addresses that will assign switching based on the line channel number (or number of time slots in one frame) are in the data memory and the control memory, the memory size is "8 bits×n channels" where n is a line channel number (number of time slots).

In order to read the data memory, i.e., in order to read a specific address of the data memory during each time slot, it (the address) is written into a cell (having a specific address) of the control memory in accordance with the order of formation by a control device.

Therefore, when information written in the data memory is read as an output time slot, the information in the data memory address is written by recording the address value in the control memory.

The time switching order (sequence) is performed periodically in each frame until the information in the control memory is changed by the processor.

The time switching currently being used when needed comprises said data memory, control memory, a ROM for suitably converting data to the output status and an attribute memory (RAM) for saving a conversion method and an operation mode about each of the output ports.

Figure 1:
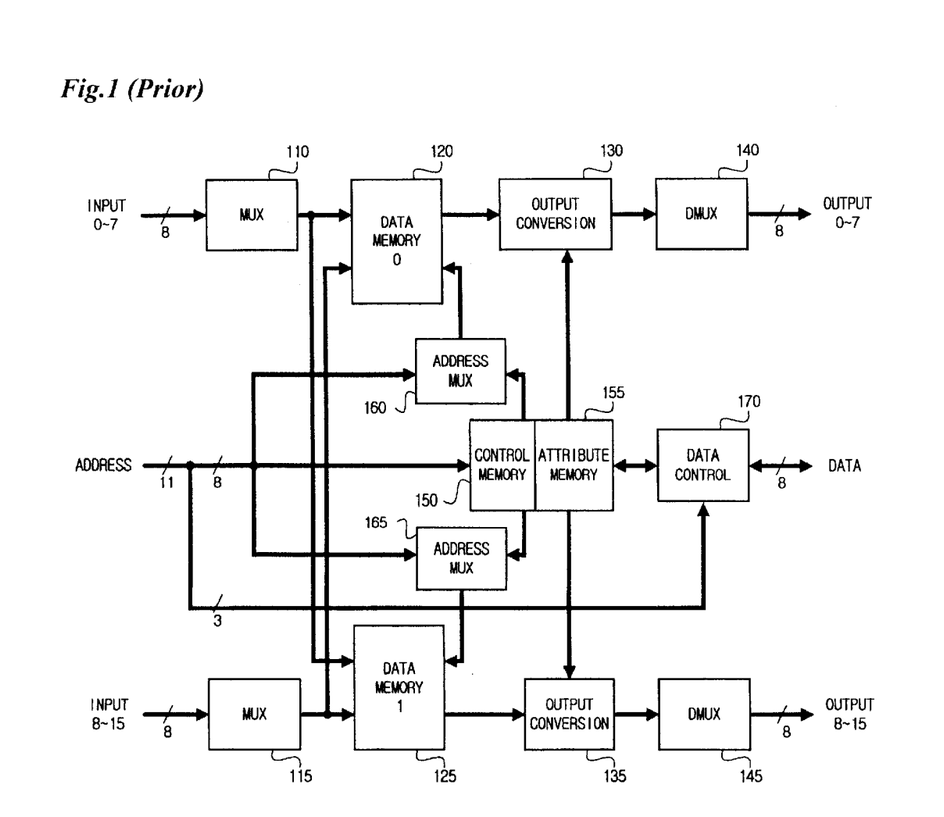
FIG. 1 is a block diagram of a 16×16 time switch of the prior art having an 8 bit control memory.

The prior art time switching with an 8 bit control memory will be described in detail by referring to the drawings. FIG. 1 is a block diagram illustrating the operation of an 8 bit control device of a 16×16 control memory currently in use.

The 16×16 time switch comprises:

16 input ports divided into two blocks of respectively 8 ports (0~7 and 8~15);

an 11 bit address input transmitted from the processor in order to control all of the 800H ($2^{11}$)×8 bit sized overall memory;

2 MUXes (110)(115) for converting the 8 bit serial data transmitted from the upper and lower input ports, respectively, into 8 bit parallel data, and sending the parallel data into the data memory;

a data memory 0 (120) composed of 256×8 bit sized DM00 and DM01 for saving said 8 bit parallel data 256 channels (8 ports×32 channels);

a data memory 1 (125) composed of 256×8 bit sized DM10 and DM11 for saving said 8 bit parallel data 256 channels (8 ports×32 channels);

a control memory (150) composed of a control memory 0 including 256×8 bit sized RAM for controlling said data memory 0 and a control memory 1 including a 256×8 bit sized RAM for controlling said data memory 1 by the subscriber exchange information transmitted by the processor;

a 256×8 bit sized attribute memory (155) for controlling each output ports according to the operation mode;

two address MUXes (160)(165) for choosing between the address transmitted from control memory (150) into the data memory (120)(125), respectively, and the address transmitted from the processor directly into data memory (120)(125);

a data control block (170) controlling the data bus in order to alternatively select and send data transmitted from the processor into control memory (150), attribute memory (155) and data memory (120)(125);

two output conversion blocks (130)(135) for converting data from said data memory (120)(125), respectively, into the data suitable for output form;

2 DMUXes (140)(145) for converting each bit of the parallel data from said output conversion blocks (130) (135), respectively, into serial data by assignment suitable for each output ports; and 16 output ports divided into an 8 bit upper/lower block, respectively.

A clock signal, a frame synchronization signal and a reset signal are inputted into all of said blocks.

Figure 2:
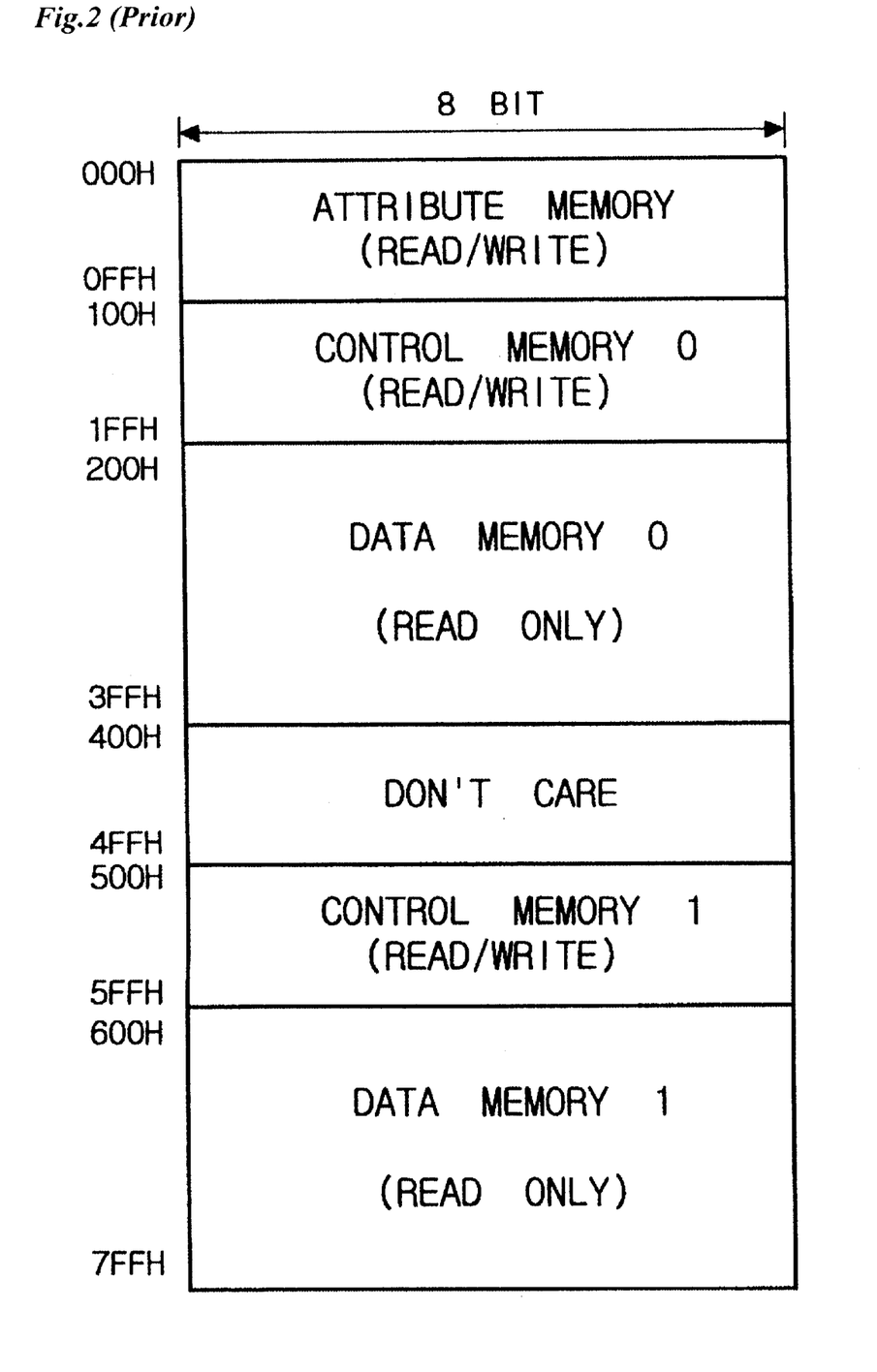
FIG. 2 is a representation of the overall memory map structure of FIG. 1.

FIG. 2 is a block diagram illustrating an overall memory map in the processor of the prior art time switch of FIG. 1. Since the data memory of the time switch is only written by the primary input ports, the data memory portion is only readable by the processor.

The operation of the time switch will be explained in detail as follows.

If channels are set up and the time switch powers on in a communication system, the serial data is successively input through 16 input ports by synchronizing it with the clock signal. The serial data (each input port×32 channels (time slots) and 0~7 ports, 8~15 ports) is input through 32 channels in a period of one generated frame as synchronized with the frame synchronization signal. The serial signals transmitted through each port are transmitted into the upper/lower port MUX (110)/(115), respectively, and are converted into 8 bit parallel data for channel division and simplicity of handling.

The parallel data is multiplexed in the MUXes (110)(115), i.e., input port 0~7 is sent into DM00 (120) and DM10 (125), and input port 8~15 is sent into DM01 (120) and DM11 (125), and is stored at the same time. Therefore, the 512 byte sized data memory 0 (120) composed of DM00 and DM01, and the 512 byte sized data memory 1 (125) composed of DM10 and DM11 respectively store the entire contents of input ports 0~15.

Figure 3:
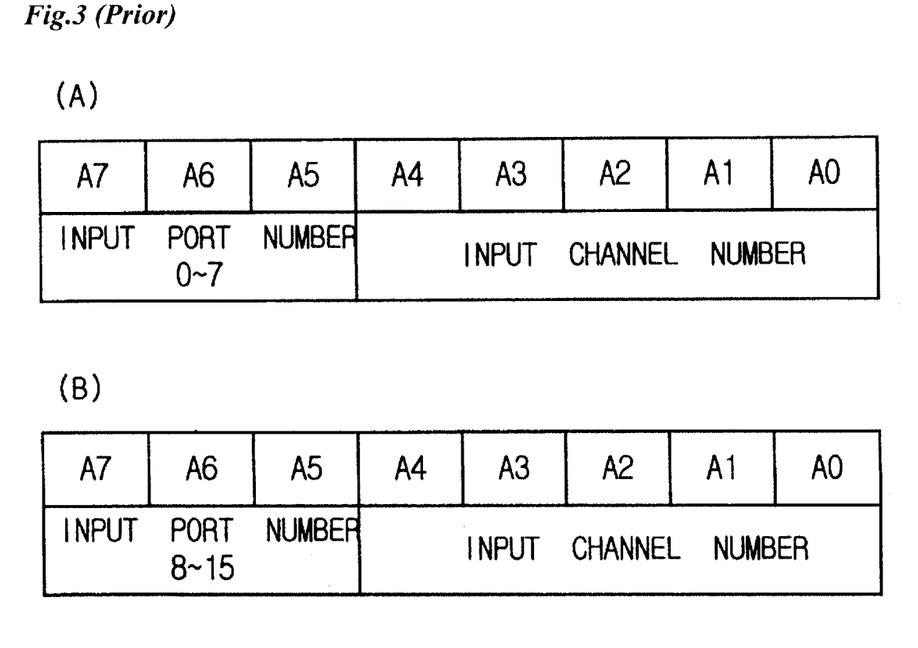
FIG. 3a illustrates the address format of the first 8 input ports of the data memory of FIG. 1.
FIG. 3b illustrates the address format of the second 8 input ports of data memory of FIG. 1.

A write address for the data memory (120)(125) corresponds with the port/channel number of the input port. FIG. 3 illustrates the 8 bit address format of the data memory.

FIG. 3(a) illustrates the address format of the data memory 00 (DM00) and the data memory 10 (DM10) and FIG. 3(b) illustrates the address format of the data memory 01 (DM01) and the data memory 11 (DM11). The time interval during which data is written on the data memory (120)(125) is determined by the time slot interval regardless of the processor.

If the time switch circuit is powered on, the processor must write exchange (switching) information into the control memory (150) and the attribute memory (155) in addition to reading data. This process is the time switch setting process for creating a communication channel. The processor uses the data control block (170) in order to choose the memory to write its contents.

When the processor reads/writes the control memory (150) or the attribute memory (155), or when the processor reads data memory (120)(125), the processor chooses one among the three kinds of memory by using the upper 3 bits of the 11 bit address bus, and then sends said data on the remaining 8 bits of the bus into the selected memory.

Figure 4:
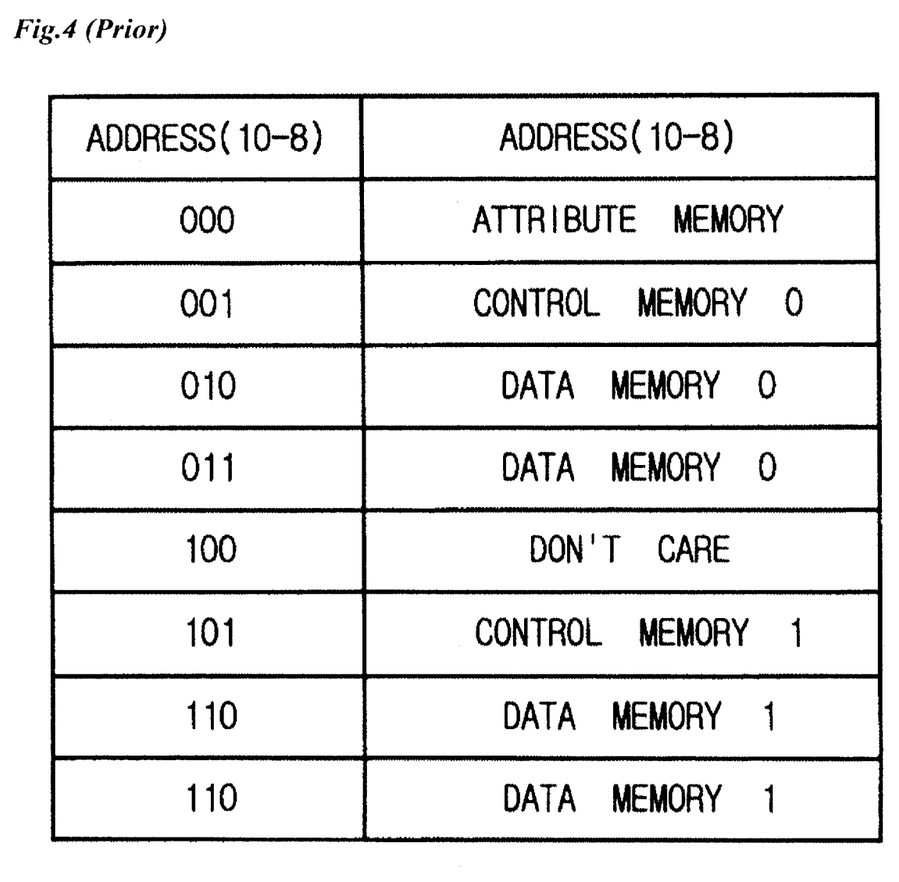
FIG. 4 illustrates a select table of memory according to an address bus of FIG. 1.

FIG. 4 is a chart illustrating the memory choice by the binary encoding of the upper 3 bits of the address bus in the data control block (170). For the processor to write data in the control memory (150), the data is transmitted into the control memory through the data bus by setting the upper 3 bit address into 001 or 101. The data saved in the control memory (150) is the input/channel number for reading the respective data memory (120)(125).

The control memory 0 memorizes exchange information about output ports 0~7 and the control memory 1 memorizes exchange information about output ports 8~15. The write address of the control memory (150) is in accord with the port/channel number of the output port. The control memory 0 and the control memory 1 parts of the control memory (150), (i.e., each 256 (8 port×32 channel) byte sized portion), have the address of output ports 0~7 and output ports 8~15, respectively. In addition, the port/channel number of the input port is saved as a byte (8 bits) in each control memory (150).

Figure 5:
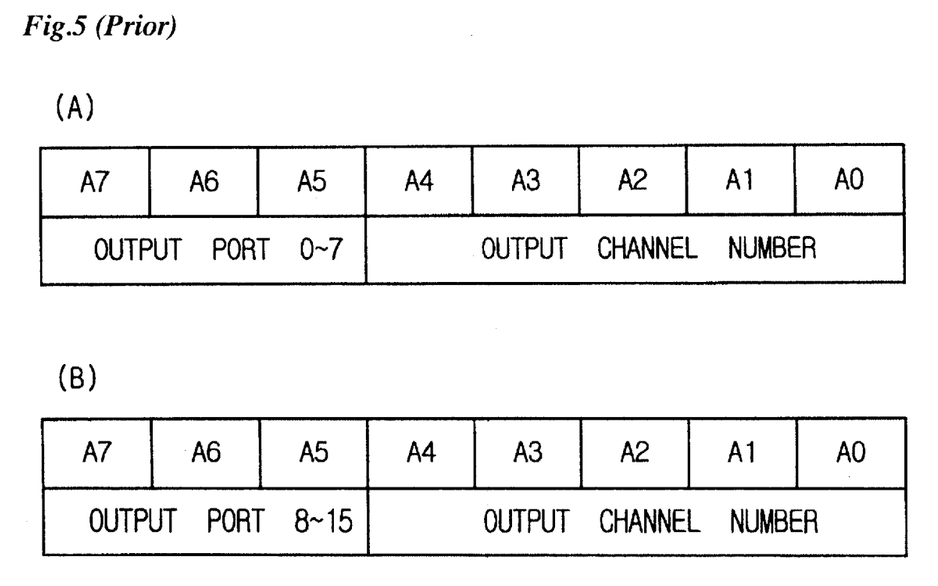
FIG. 5a illustrates the address format of the first 8 output ports of the control memory of FIG. 1.
FIG. 5b illustrates address format of the second 8 output ports of control memory of FIG. 1.

FIG. 5 illustrates an address format for each control memory. FIG. 5(a) illustrates the address format of the control memory 0 and FIG. 5(b) illustrates the address format of the control memory 1. Data saved in the attribute memory (155) determines whether the upper 3 bits of said control memory data format represent the upper block of the input port or the lower block of the input port. The processor chooses and saves data to the attribute memory (155) so as to memorize/record the operation mode which decides the operation of the output port. Through the application of the saved operation mode information, the attribute memory establishes the data conversion method output to the specific port.

The operation mode information saved in the attribute memory (155) has a message mode and a switch mode. The message mode is an operation mode that causes the processor to read the saved input port number for the output port from the control memory (150). In this case, the data is transmitted into the output port directly without output conversion.

The switch mode is the operation mode for deciding a method by which the data read from the data memory (120)(125) is converted to make it suitable for the output port status in the output conversion blocks (130)(135).

In order to write the data in the attribute memory (155), the processor sets the upper 3 bits of addresses as 000 and sends the data (FIG. 4). The 8 bit data of the attribute memory (155) establish the operation mode and a conversion rule for the current output port.

Figure 7:
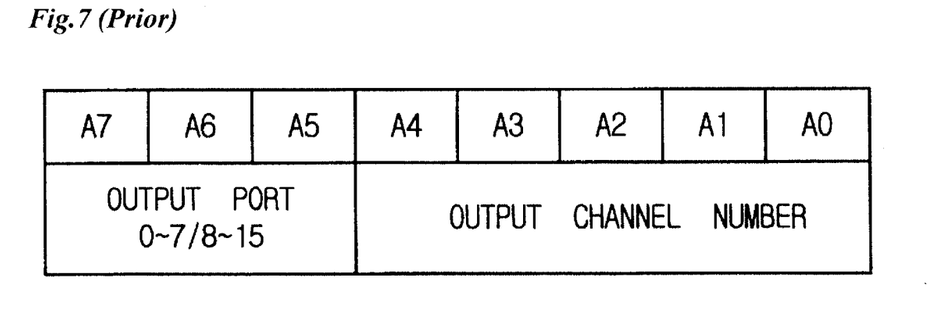
FIG. 7 illustrates the address format of the attribute memory of FIG. 1.
Figure 8:
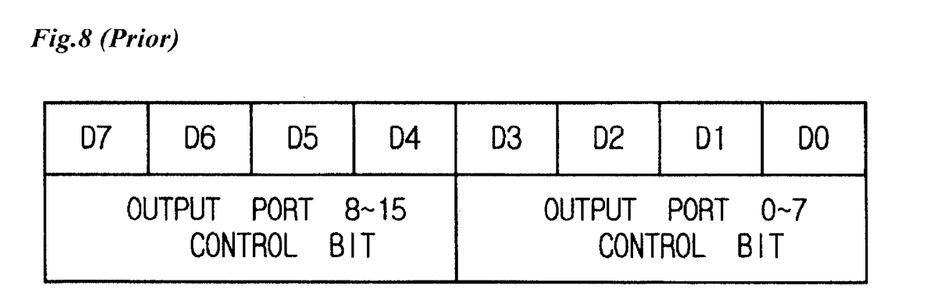
FIG. 8 illustrates the data format of the attribute memory of FIG. 1.
Figure 9:
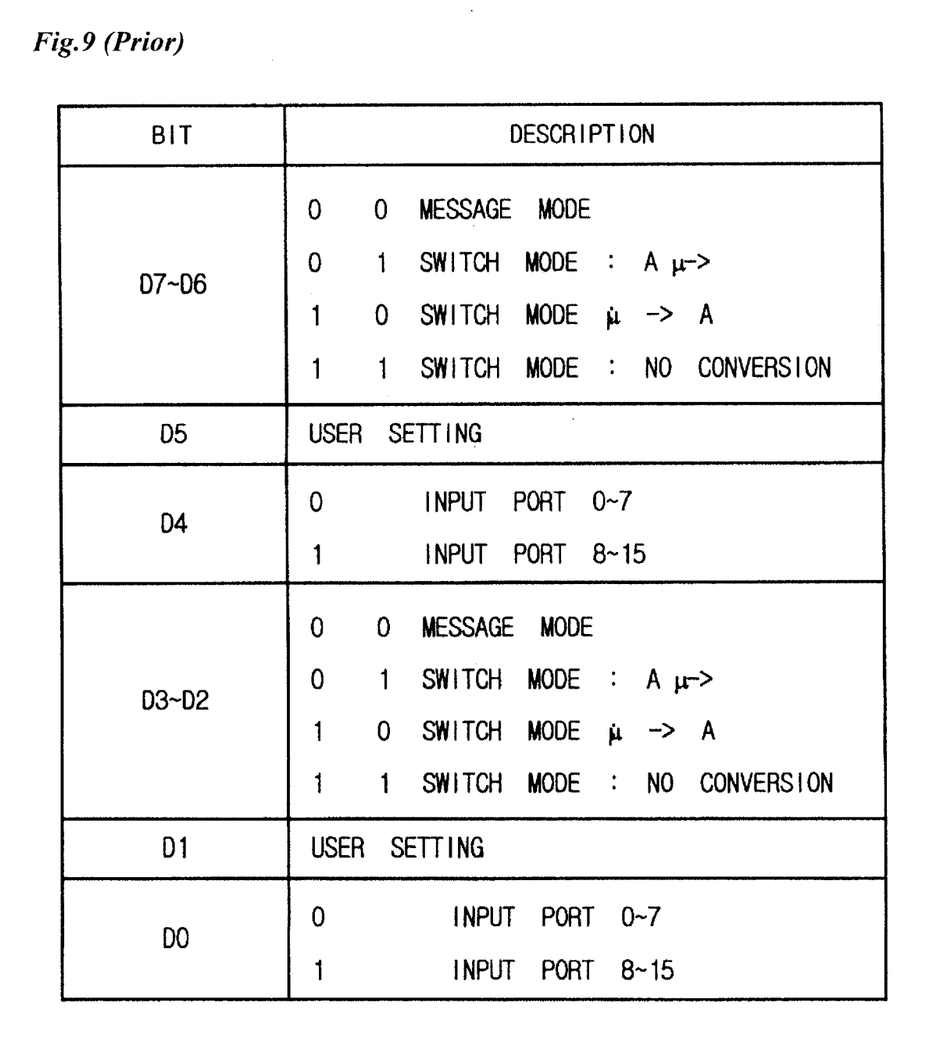
FIG. 9 illustrates an operation according to the data format of the attribute memory of FIG. 1.

FIG. 7 illustrates the address format of the attribute memory, FIG. 8 illustrates data format of the attribute memory, and FIG. 9 illustrates an operation according to the data format of the attribute memory.

Before the channel setting and the exchange (switch) operation, the control memory (150) and the attribute memory (155) save the conversion information for output conversion blocks (130)(135), or exchange information (input port/channel number) of a subscriber transmitted through the 8 bit data bus at the position selected as an 8 bit address bus from the processor. The data read from the control memory (150) for exchanging (switching) an output port order is transmitted into the data memory by saving the data format about each output port in the attribute memory (155). This data becomes a read address of the upper block (DM00 or DM10) of the two data memories (120)(125) saving the upper input port data or the lower block (DM01 or DM11) of the two data memories saving the lower input port data.

The data read in data memories (120)(125) is lined up in the output port order and transmitted into the next block. The data transmitted through the input port is switched into the desired output port/channel by said process.

The output conversion block (130)(135) converts data switched in said block into the suitable form based on the output status. The output conversion block composes and saves required information as a ROM for nonlinear quantization principle conversion.

In order to transmit a signal in the communication system, the original signal is digitized by sampling it in a uniform period on a time domain, and said process is performed by quantization.

Figure 6:
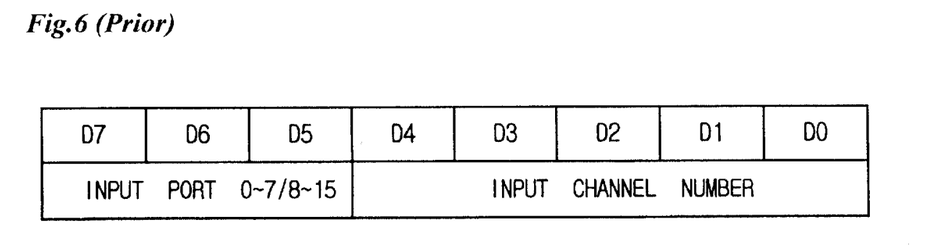
FIG. 6 illustrates the data format of the control memory of FIG. 1.

Noise generated due to approximating a continuous quantity to a discrete value is called quantization and results in signal deterioration according to the digitization. Therefore, it is possible to improve the overall signal-noise ratio by using a method which takes a close (narrow) quantization width in regions where the amplitude of the signal is small, and which takes a wide quantization width in regions where the amplitude of the signal is large. This method is called nonlinear quantization and it is realized by companding. The companding principle has an A-principle and a $\mu$-principle recommended by ITU-T. The output conversion blocks (130)(135) convert both kinds of principles. The ROM within the output conversion blocks (130)(135) saves data for converting A-principle into $\mu$-principle or data for converting $\mu$-principle into A-principle. The output conversion blocks(130)(135) decide the conversion method for the port to which converted data would be outputted according to the data of the attribute memory, and converts data transmitted from the data memory (120)(125). In this case, the information of the conversion methods is contained in two kinds of data saved in the ROM (output conversion blocks). FIG. 6 illustrates a switch mode for a conversion method saved in an attribute memory.

After the conversion method has been determined, the output conversion blocks (130)(135) convert data transmitted from the data memory into a status suitable for the companding principle. Therefore the exchanged 8 bit parallel data becomes the ROM address chosen by the operation mode. The data read by the applicable address becomes the input data converted by the companding principle and is transmitted into the output ports.

In the output conversion blocks (130)(135), the 8 bit parallel data, converted into a suitable form by the companding principle, are assigned to the output port by each bit through each of the two DMUXes (140)(145), respectively, and said data is converted into serial data and outputted. The DMUX converts each bit into 8 bit data by a counter operation and then assigns the data to each output port in order.

For driving the time switch as noted above, the processor writes information for exchange (switching) in the control memory (150) in units of 8 bits (1 byte) before reading the data of the data memory (120)(125). However, if the processor reads/writes exchange (switching) information in the control memory in units of 8 bits, the processor needs 9 bits for representing the 16 input ports and the 32 time slots, and additionally requires at least 3 bits for output conversion.

Therefore, the processor has to write, in advance, the input port range connected with each output port, and the operation mode for converting data reading in the data memory according to the output block status. Thus, the 8 bit data transmitted from the processor, in addition to the data control block, is alternatively transmitted into the control memory (150), the attribute memory (155), the data memory (120)(125) as required.

As such, twice the amount of access time is required in order to save the switch information for setting up an initial switch operation. In addition, the complex data format is necessary in handling of each chip for the data control block (170) and address MUX blocks (160)(165). Accordingly, many problems occur. For example, the complexity of the design requires an additional block, resulting in a size increase, and the complex data format increases chip handling and results in access time delays.

Furthermore, the time switch controls gain by each line because the output gains of switch subscribers widely vary according to the region being used. In this case, if the gain is controlled outside the time switch, a special apparatus is required in order to carry out gain control by each line.

Therefore, the exchange (switching) system becomes more complex and the prime cost increases. In addition, there is the problem that the size of the time switch gets too large.

SUMMARY OF THE INVENTION

It is therefore an object of the present invention to solve the problems of the prior art by providing a method for controlling the 16×16 time switch of the processor in a communication system.

It is a further object of the invention to provide a method for controlling the control memory of a time switch which eliminates the need for an address MUX block and data control block by employing a word (16 bit) operation method.

It is another object of the invention to provide gain control in one time switch by creating memory saving information for gain control by lines in an output conversion block within a time memory.

In one preferred mode, a time switch with a control memory for performing a word operation comprises: 16 input ports divided into an 8 port upper block and an 8 port lower block, an address bus transmitted from a processor for controlling memory; a 16 bit data bus transmitted from the processor; two multiplexers for sending 8 bit data into the upper/lower input ports, respectively; a data memory 0 and a data memory 1 for saving the upper and lower block 8 bit parallel data; a control memory composed of a 256×16 bits (512 byte) sized control memory 0 for controlling said data memory 0 and a 256×16 bits (512 byte) sized control memory 1 for controlling said data memory 1; two output conversion blocks for converting the exchanged 8 bit parallel data according to the output status; two demultiplexers sending the exchanged 8 bit parallel data into an output port assigned by each bit; and 16 output ports divided into an 8 port upper block and an 8 port lower block.

In one preferred mode, a method for controlling a time switch with a control memory performing a word operation according to the present invention includes the step of writing exchange information into the control memory for exchanging a specific input into a specific output by using a 16 bit data bus; and performing conversion according to the output status.

The descriptions of important symbols used in the above drawings are as follows:

110, 115: MUX;
120, 125: data memory;
130, 135: output conversion block;
140, 145: DMUX;

150: control memory;
155: attribute memory;
160, 165: address MUX;
170: data control block;
210, 215: MUX;
220, 225: data memory;
230, 235: output conversion block;
240, 245: DMUX;
250: control memory;

While the invention is susceptible to various modifications and alternative forms, specific embodiments thereof have been shown by way of example in the drawings and will herein be described in detail. It should be understood, however, that it is not intended to limit the invention to the particular forms disclosed, and the intention is to cover all modifications, equivalents, and alternatives falling within the spirit and scope of the invention as defined by the appended claims.

DESCRIPTION OF PREFERRED EMBODIMENTS

According to an embodiment of the invention, a time switch having a control memory performs word operations and includes 16 input ports divided into an 8 port upper block and an 8 port lower block. An address bus transmitted from a processor provides control information to the control memory. A 16 bit data bus connects the control memory with the processor, and two multiplexers send 8 bits of data into each of the upper and lower input ports, respectively. A data memory 0 and a data memory 1 save the upper and lower block 8 bit parallel data, respectively. The control memory includes a 256×16 bit (512 byte) sized control memory 0 for controlling the data memory 0, and a 256×16 bit (512 byte) sized control memory 1 for controlling the data memory 1. Two output conversion blocks convert the exchanged 8 bit parallel data of the respective upper and lower blocks according to the output status, and two demultiplexers send the exchanged 8 bit parallel data into the output port assigned by each bit. The 16 output ports are respectively divided into an 8 bit upper block and an 8 bit lower block.

According to an embodiment of the present invention, the lower 9 bits (e.g., 0–8) of the 16 bit data bus manages information about 16 input ports and 32 time slots in the control memory, and the next upper 6 bits (e.g., 9–14) of said 16 bit data bus, carry out data conversion in accordance with the output port status by being transmitted into the output conversion blocks.

The output conversion blocks perform conversion through a memory having data for companding principle conversion and the gain memory. The gain memory contains a calculation value according to multiple gain levels and is composed of a ROM and a RAM.

It is preferable to dynamically fix errors in the output gain control value for subscribers of a switch system such that one time switch can control the gain of a channel up to a maximum of 512 lines.

It is also preferable to switch output to a gain level for subscribers of a switch system and to control the gain of output for subscribers of a switch system inside the time switch.

The method for controlling the control memory within a 16×16 time switch having input ports divided into an upper and lower block, an address bus, data buses, multiplexers, data memories, a control memory, output conversion blocks, demultiplexers and output ports, which performs a 16 bit word operation comprises the steps of writing exchange information for exchanging a specific input into a specific output in the control memory by using a 16 bit data bus; and performing a conversion according to the output status.

The lower 9 bits of the 16 bit data bus are used in order to write exchange information into the control memory and the next upper 6 bits of the 16 bit data bus are used (leaving the uppermost bit free) to convert according to the output status and to perform gain conversion by using a memory having data for companding conversion or a gain memory having a calculation principle value according to multiple gain levels. In one embodiment, the gain memory comprises a ROM and a RAM.

The present invention will be explained in detail through the drawings and its preferred embodiments.

Figure 10:
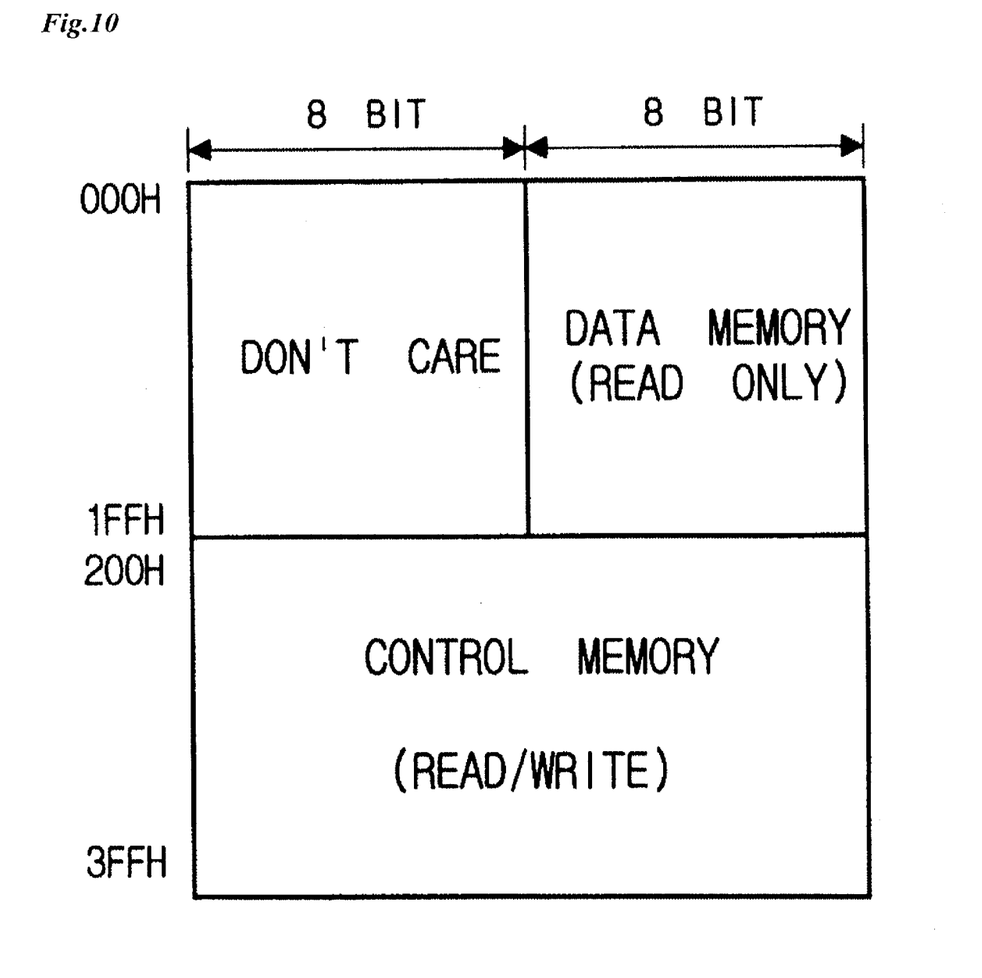
FIG. 10 illustrates the map structure of the entire memory of a time switch having a 16 bit control memory according to an embodiment of the present invention.
Figure 11:
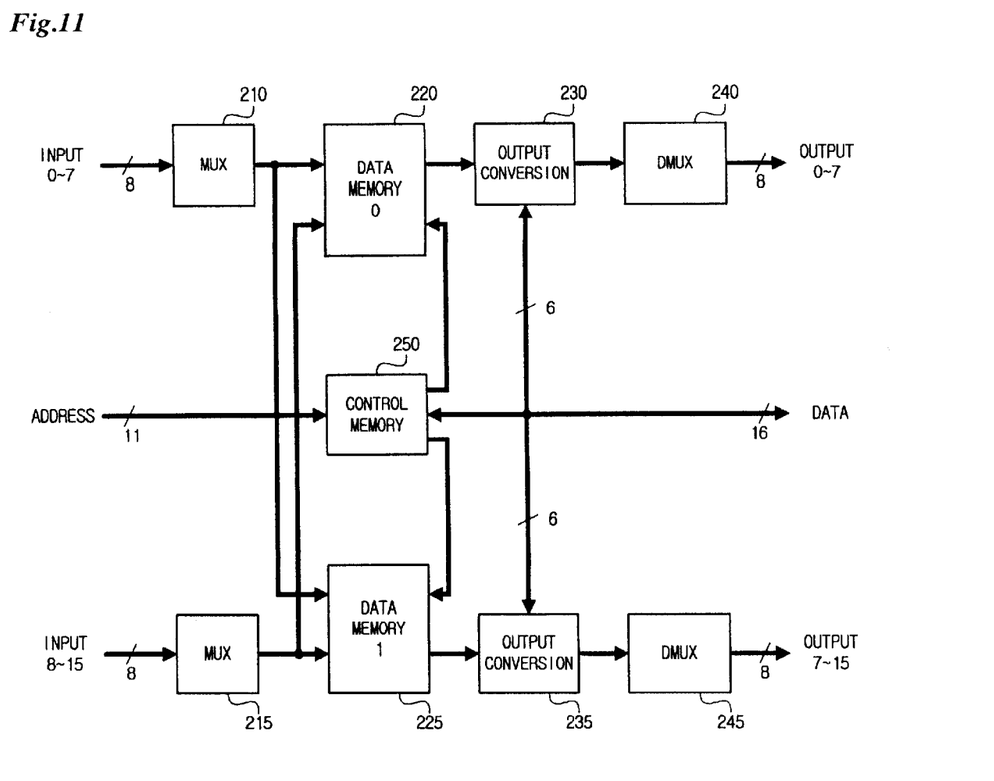
FIG. 11 is a block diagram of a 16×16 time switch having a 16 bit control memory according to the present invention.

FIG. 10 illustrates an overall map structure of a 16 bit control memory of a time switch according to an embodiment of the invention. FIG. 11 illustrates a block diagram of a 16×16 time switch having a control memory controlled by 16 bits according to an embodiment of the invention.

The lower 9 bits of the 16 bit data bus are transmitted into the control memory (250), representing information of 32 ($2^5$) time channels (time slots) in 16 ($2^4$) input ports. The upper 6 bits are transmitted into the output conversion blocks (230)(235), and provide information required for gain control or conversion by companding principle. The uppermost bit is not treated as surplus information. A clock signal, a frame signal and a reset signal are inputted into all said blocks When the time switch circuit power is activated, all blocks perform a reset operation and each of the 16 input ports synchronize with the clock signal and the frame synchronization signal, and inputs 32 input channels (time slots) having a cycle of one frame.

The input serial data received at the upper and lower input ports is converted into 8 bit parallel data by the 2 MUX blocks (210) and (215), respectively, and then sequentially written into a 256 byte sized data memory 0 (220) and data memory 1 (225), respectively, via an 8 bit channel of each. The data transmitted through the upper 8 input ports (i.e., 0~7) is saved in the data memory 0 (220) through the MUX block (210) and the data transmitted through the lower 8 input ports (8~15) is saved in the data memory 1 (225) through the MUX block (215).

When the power is on, the processor (not shown) writes information for the switch into the control memory (250) via an address bus, and the data is saved in the data memories (220) and (225) of the upper and lower input ports, respectively. The control memory 0 and the control memory 1 within control memory (250) are comprised of a 256×16 (256 words) sized RAM in order to save the information on the 16 bit data bus. The processor saves an input port/channel number in the control memory by using the 16 bit data bus.

Figure 12:
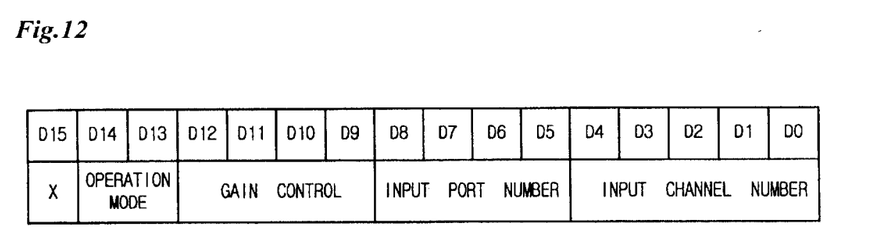
FIG. 12 illustrates the data format of the control memory of FIG. 11.

FIG. 12 illustrates the data format of the control memory of FIG. 11. As illustrated, the control memory (250) uses the lower 9 bits (D0–D8) of the 16 bit data bus to designate input port/channel. Thus, control memory (250) can choose numbers about all of 16 input ports and 32 channels. The upper 6 bits (D9–D14) of the 16 bit data bus represent information for data conversion by the output data bus which is transmitted into the upper and lower output conversion blocks (230) and (235), respectively.

In the control memory (250) which is composed of two 256 words (256×16 bits) sized blocks, the lower 9 bits of data become the address for reading two data memories (220)(225), which are read in output port order. That is, the data saved in the control memory (250) becomes the exchange information for the time switch and is read via the data memories (220) (225). The data saved in the respective data memory (220) (225) is exchanged by reading the control memory (250) address in the order of output port/channel number. The exchanged data is converted into suitable values in the output conversion blocks (230) (235).

The exchange information for each output port, as illustrated FIG. 12, is set up as an upper 6 bits (e.g., D9–D14) of the data bus. The two uppermost bits of the upper 6 (i.e., D13 and D14) represent the operation mode for each output port in the respective output conversion blocks (230)(235) for data conversion in the output part. The operation mode has a message mode shown in the prior art, a switch mode for companding principle conversion and a gain control mode.

Figure 13:
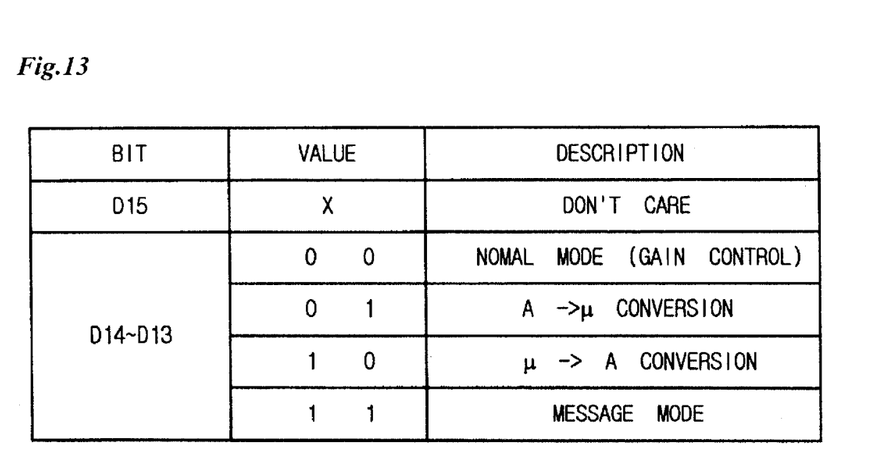
FIG. 13 illustrates an operation mode according to the data format of FIG. 11.

FIG. 13 illustrates an operation mode according to the data format shown in FIG. 12. The output conversion blocks (230)(235) read the upper 2 bits (D14 and D13) of the data bus and decide an exchange method suitable for the exchanged data. In other words, if the D14 or D13 bit representing the operation mode for the output port is 01 or 10 respectively, it is chosen as a companding principle conversion mode for converting A-principle and , $\mu$-principle. Then the output conversion blocks (230)(235) get data conversion information transmitted from the data memory, (i.e., one of two ROMs (A→$\mu$ or $\mu$→A)) having the necessary data for performing the required companding principle conversion.

In the time switch according to the present invention, a 6 bit data bus for signaling the output conversion block (230)(235) can be used. This makes it possible to save information for the gain control by channel (line) as well as information about the companding conversion. That is, when D14 or D13 of the data bus is 00, it is chosen as a gain control mode and the memory for the gain control is selected.

The four (4) bits (D9~D12) are used for compensating for various gain changes in each output port about the signal converted and outputted, in the output conversion blocks (230)(235).

The output conversion blocks (230)(235) choose multiple gain changing levels according to changes in the four bits (D9–D12) and compose, in advance, the calculation value corresponding to each gain value as the gain memory. Therefore, it is possible to compose the gain memory of the maximum 16 kinds of levels in the output conversion blocks (230)(235) by using 4 bits (D12~D9) of the data bus.

The exchanged 8 bit parallel data becomes the read address of the gain memory specifying a particular gain level selected by the data bus value (D12~D9). The data read by each address become values converted by the output gain level.

As noted above, the gain level is determined by 4 bits written in the specific bits (D12~D9) of the data bus, and the gain is controlled by reading the calculation value according to the position of the gain memory for each output port/channel appropriately.

The converted 8 bit parallel data in said output conversion blocks (230)(235) is transmitted into the respective DMUX blocks (240)(245) and assigned suitably to the output port by each bit and then outputted as serial data.

The time switch of the present invention having the 16 bit control memory operates as noted above. The time switch reads/writes data in word units in the two 256×16 bit (256 word) sized control memory (250) in accordance with using a 16 bit data bus. This makes it possible to assign the lower 9 bits written to the data bus for choosing the port/channel number and selecting all 16 input ports. Accordingly, the control memory (250) can read the whole data memory 0 (220) and the data memory 1 (225), through 9 bits of data which contain information for the input port/channel number.

As such, the attribute memory (155) for creating the operation mode of the prior art is not necessary for designating the output port/channel number for the input port/channel number saved in the control memory (250). In addition, it is not necessary to save conversion information about each output port in the attribute memory in advance because a part of the 16 bit data bus is separately assigned for the output conversion blocks (230) (235). Thus, since the processor initially writes data only in the control memory, the process of writing data in the attribute memory is no longer required, and as such, the data block which chooses between the control memory (150) and the attribute memory in the processor is also not necessary.

The processor can perform the operation of reading data from the data memory through the control memory in the output conversion block and convert data suitable for each output port status at the same time. Since the address MUX block and the control block of the prior art are no longer required, it is possible to reduce the switch setting time of the time switch because the processing time for writing exchange information in the control memory and the attribute memory is not necessary.

In order to achieve the second object of the invention, the time switch is made to operate as noted above and to read/write data in word units to/from the two 256×16 bit (256 word) sized control memories (250) by using the 16 bit data bus. This makes it possible to assign the upper 6 bits, except an uppermost bit, in the data bus for the output conversion blocks (230)(235).

Since the time switch controls the output conversion blocks (230) (235) by using 6 bits (D9~D14), it is possible to convert for the companding principle and to control the gain by the each output block.

The time switch judges whether the operation mode for the output conversion is the switch mode requiring the companding principle conversion or the gain control mode requiring the gain level adjustment. When it is the gain control mode, the gain memory is selected by the gain level shown by 4 bits written in the specific memory (D12~D9) of the control memory.

The exchanged 8 bit parallel data becomes the address of the gain memory and the gain calculation value is outputted into the each output port/channel. The outputted gain calculation value is the value by which the gain is controlled appropriately by the parallel data.

In the 16×16 time switch performing exchange of 512 time slots case, it is not necessary to control the gain by using a special device for each channel outside the time switch through said operation. Thus, it is possible for a switch to control gain up to a maximum of 512 lines.

In one preferable embodiment of the present invention, the gain memory to be constructed in the output conversion block can be made up with a ROM used only for reading the gain calculation value of 4 bits of the data bus. That is, the gain memory selects 8 gain levels (0, −1, −2, −3.5, −4, −5, −6, −7 dB) generally used and comprises, in advance, the calculation value corresponding to each gain level value as 8 ROMs. This makes it possible for the time switch to select the calculation value based on 3 bits (D11~D9).

The gain level is selected by 3 bits written in the specific address of the control memory and the time switch finds and reads the value corresponding to the exchanged 8 bit parallel data (address). Thus, the time switch can control the gain appropriately according to each output port.

In a second embodiment, the gain memory can be comprised of a RAM. The use of the RAM solves the problem requiring the use of a fixed gain memory. This is because the 8 aforementioned gain levels cannot be fixed using a ROM, only the gain calculation level.

The 256×8 bit RAM is used instead of the ROM when the output port/channel gain is changed by the properties of the region where the system is set up. In addition, the 256×8 RAM is used for the advance fixing of the error value calculation in the gain control block.

The operator calculates the gain control level value required according to his opinion, resets the gain control RAM according toeach level, and then performs the gain control for each channel using the RAM.

The gain memory as a ROM selects a maximum of 16 kinds of levels according to the specific 4 bits of the data bus, and then reads the data by using the exchanged 8 bit parallel data from the data memory as a read address of the 256 byte sized gain memory, thus enabling the proper gain control performance. The use of the RAM that can record the calculation value in accordance with the gain level in the processor enables the system to handle changes in the control level made by the operator.

In another embodiment of the present invention, the gain memory can comprise both a ROM and a RAM. In other words, each gain level used is generally stored in a ROM, respectively. Thus, it is possible to utilize the RAM for saving the calculation values according to the gain levels which will be used when necessary. The maximum number of RAM and ROM locations is 16 since 4 bits among the 16 bit data bus are used to choose the gain memory.

Figure 14:
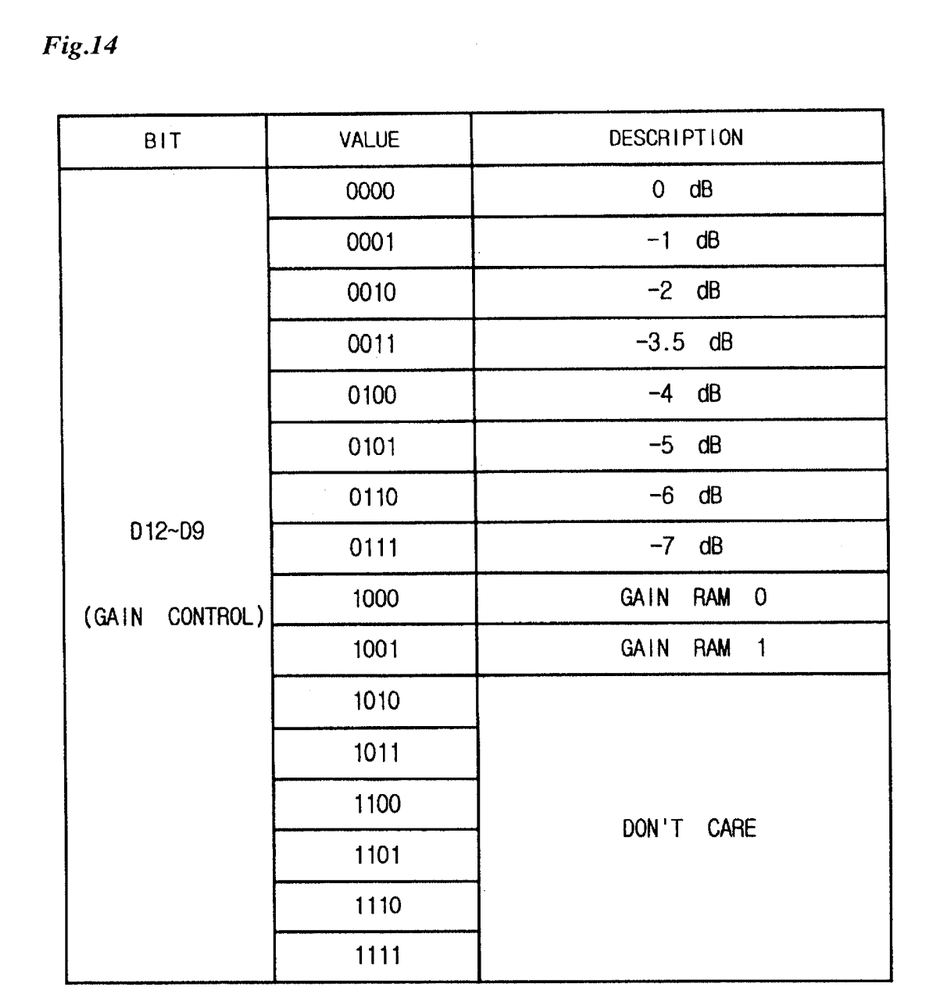
FIG. 14 illustrates a gain control operation according to the data format of FIG. 11.

FIG. 14 illustrates an example of the use of a ROM and RAM where the gain ROM, according to 8 gain levels being used most generally, is selected as 3 bits of D11~D9, and two arbitrary RAMs are used and are selected as the 4 bit of D12~D9. As illustrated, if D12 is 0, it is possible to select one among 8 ROMs and if D12 is 1, it is possible to select one among 2 RAMs.

The 16 bit control method of the invention makes it possible to use 9 bits for selecting 16 input port/32 channel in the control memory. Therefore it is possible to perform the process of reading data about the input port/channel, saved in the control memory without requiring the conventional process of reading/writing the select mode or the operation mode of the input port upper/lower block into the attribute memory. Also, because it is possible to assign 6 bits of the 16 bit data bus for gain control, it becomes possible that one time switch can control the gain up to a maximum of 512 lines. This eliminates the need for external gain control for each channel outside the time switch.

As noted above, in the present invention, the control memory within the time switch is carried out by the 16 bit (a word) operation method. Due to the removal of the address MUX block and the data control block in the prior time switch, the time switch design becomes simple, and results in beneficial effects, such as simplicity of the chip handling, and a reduction of switch setting time through the processor and the interface.

Other advantages are the simplicity of the exchange system, original line cost reduction, etc. This is because one time switch can control the gain up to a maximum of 512 lines without requiring external gain control by each channel outside the time switch.

What is claimed:

1. A time switch for TDM communication systems having a control memory performing a word operation comprising:

(a) 16 input ports divided into an upper block and a lower block;

(b) an address bus coupled to a processor for providing the control memory with control information;

(c) a 16 bit data bus, which consists of a lower and an upper bit data bus, coupled to the processor;

(d) an upper and lower multiplexer for sending 8 bit data being transmitted into the upper and lower input ports, respectively, into a data memory;

(e) said data memory comprising an upper data memory and a lower data memory for saving the upper and lower block 8 bit data, respectively;

(f) a control memory having an upper 256×16 bits (512 byte) control memory for controlling said upper data memory and a lower 256×16 bits (512 byte) control memory for controlling said lower data memory;

(g) an upper and lower output conversion block for converting exchanged 8 bit data according to an output status;

(h) an upper and lower demultiplexer for sending the converted 8 bit data into output ports assigned by each bit; and (i) 16 output ports divided into an 8 bit upper block and an 8 bit lower block, respectively.

2. The time switch as claimed in claim 1, wherein a lower 9 bits of said 16 bit data bus manages information about the 16 input ports and 32 time slots in the control memory.

3. The time switch as claimed in claim 1, wherein an upper 6 bits of said 16 bit data bus perform data conversion according to the output port status in accordance with transmission into said output conversion blocks.

4. The time switch as claimed in claim 3, wherein said output conversion blocks perform conversion through a memory having data for companding principle conversion, and a gain memory having a calculation value according to multiple gain levels.

5. The time switch as claimed in claim 4, wherein said gain memory comprises a ROM.

6. The time switch as claimed in claim 4, wherein said gain memory comprises a RAM.

7. The time switch as claimed in claim 4, wherein said gain memory comprises a ROM and a RAM.

8. The time switch as claimed in claim 1, wherein errors in output gain are dynamically fixed for subscribers of a switch system.

9. The time switch as claimed in claim 5, wherein one time switch can control the gain by a channel up to a maximum of 512 lines.

10. The time switch as claimed in claim 5, wherein the time switch outputs a gain level for subscribers of a switch system.

11. The time switch as claimed in claim 4, wherein the output gain for subscribers of a switch system is controlled inside the time switch.

12. A method for controlling a control memory within a 16×16 time switch for performing a word operation, the time switch having input ports divided into an upper/lower block, an address bus, data buses, multiplexers, data memories, a control memory, output conversion blocks, demultiplexers and output ports, the time switch control method with a control memory comprising the steps of:

dividing a 16 bit data bus into a lower bit data bus and an upper bit data bus;

writing exchange information into the control memory for exchanging a specific input into a specific output using the 16 bit data bus; and performing data conversion of the exchange information according to an output status of the time switch.

13. The time switch control method as claimed in claim 12, further comprising the step of allocating 9 bits of said 16 bit data bus as said lower bit data bus for writing said exchange information into the control memory.

14. The time switch control method as claimed 12, further comprising the step of allocating 6 bits of said 16 bit data bus as said upper bit data bus for performing said data conversion according to the output status.

15. The time switch control method as claimed in claim 14, further comprising the step of performing gain conversion by using a memory having data for companding conversion.

16. The time switch control method as claimed in claim 14, further comprising the step of performing gain conversion by using a gain memory having a calculation principle value according to multiple gain levels.

17. The time switch control method as claimed in claim 16, wherein said gain memory is a ROM.

18. The time switch control method as claimed in claim 16, wherein said gain memory is a RAM.

19. The time switch control method as claimed in claim 16, wherein said gain memory comprises a ROM and a RAM.

20. The time switch control method as claimed in claim 16, further comprising the step of dynamically fixing errors in an output gain control value for subscribers of a switch system.

21. The time switch control method as claimed in claim 17, wherein one time switch controls the gain via a channel up to a maximum of 512 lines.

22. The time switch control, method as claimed in claim 17, further comprising the step of switching an output gain level for subscribers of a switch system.

23. The time switch control method as claimed in claim 17, further comprising the step of controlling the gain of output for subscribers of a switch system inside the time switch.

* * * * *

UNITED STATES PATENT AND TRADEMARK OFFICE
CERTIFICATE OF CORRECTION

PATENT NO. : 6,269,097 B1
DATED : July 31, 2001
INVENTOR(S) : Son-Jeong Keun et al.

It is certified that error appears in the above-identified patent and that said Letters Patent is hereby corrected as shown below:

<u>Title page,</u>
Title reads, "TIME SWITCH WITH THE CONTROL MEMORY" should read
-- TIME SWITCH WITH THE CONTROL MEMORY PERFORMING WORD OPERATION AND ITS CONTROL METHOD --.

Signed and Sealed this

Sixteenth Day of April, 2002

Attest:

JAMES E. ROGAN
*Attesting Officer*  *Director of the United States Patent and Trademark Office*